United States Patent [19]

Severance et al.

[11] Patent Number: 4,856,219

[45] Date of Patent: Aug. 15, 1989

[54] FISHING FLOAT

[76] Inventors: Marcus W. Severance, 1911 Martha Berry Dr., Knoxville, Tenn. 37918; Aaron A. Kirby, 5531 Pinecrest Rd., Knoxville, Tenn. 37912

[21] Appl. No.: 285,115

[22] Filed: Dec. 16, 1988

[51] Int. Cl.⁴ ............................................. A01K 93/00
[52] U.S. Cl. ...................................... 43/17.5; 43/43.1; 43/43.11
[58] Field of Search ............... 43/17, 17.5, 43.1, 43.11, 43/43.14, 42.36, 44.87, 44.92, 44.91, 44.95

[56] References Cited

U.S. PATENT DOCUMENTS

| | | | |
|---|---|---|---|
| 2,601,736 | 7/1952 | Fisher | 43/43.11 |
| 3,441,962 | 5/1969 | Williams | 43/43.11 |
| 4,103,379 | 8/1978 | Wolfe | 43/43.11 |
| 4,501,564 | 2/1985 | Cairone | 43/17.5 |
| 4,601,126 | 7/1986 | Klocksiem | 43/43.11 |
| 4,796,377 | 1/1989 | Hosegood et al. | 43/43.1 |

Primary Examiner—Nicholas P. Godici
Assistant Examiner—Michael William Starkweather
Attorney, Agent, or Firm—Pitts and Brittian

[57] ABSTRACT

A fishing float (10) for releasably engaging a fishing line (12). The float (10) comprises a pair of oppositely disposed buoyant members (14 and 16) each having a first end portion (18). In the preferred embodiment, the buoyant members (14 and 16) are fabricated of, or coated with, a luminescent material such that they glow in the dark. The float (10) also comprises a locking stem (20) for releasably joining the first end portions (18) of the buoyant members (14 and 16). The float (10) is secured to the fishing line (12) by winding the line (12) around the locking stem (20) and locking the first end portions (18) of the buoyant members (14 and 16) together so as to secure the line (12) therebetween.

11 Claims, 2 Drawing Sheets

FISHING FLOAT

TECHNICAL FIELD

This invention relates to an improved fishing float for engaging a fishing line so as to maintain such line at a preselected depth and/or signal a pull on such line. In this particular invention, the float includes a pair of luminescent buoyant members releasably joined by a locking stem.

BACKGROUND ART

Fishing floats have long been used to maintain fishing line at a preselected depth and for signaling a pull on the line, as in when a fish strikes the bait or lure affixed to the line. Heretofore, however, difficulty has been encountered in devising floats which are quick and easy to secure on the fishing line, and also hold the float secure enough to maintain the preselected position of the float on the line during casting. In this regard, many of the conventional floats which include means which adequately secure the float to the line leave kinks in the line or otherwise damage the line. Moreover, most conventional floats cannot be seen in the dark, and thus, do not serve to signal a pull on the line when fishing at night. Certain known fishing floats are disclosed in U.S. Letters Pat. Nos. 3,875,695; 4,501,564; 4,693,030; and 4,748,761.

Therefore, it is an object of the present invention to provide a fishing float which can be quickly and easily secured on a fishing line, yet does not damage such fishing line.

It is another object of the present invention to provide a fishing float which will maintain a preselected position on fishing line during casting.

A further object of the present invention is to provide a fishing float which glows in the dark in order to facilitate fishing at night.

Still another object of the present invention is to provide a fishing float which is inexpensive to manufacture and which is durable.

DISCLOSURE OF THE INVENTION

Other objects and advantages will be accomplished by the present invention which provides a fishing float for releasably engaging a fishing line and for floating on the surface of water so as to maintain the line at a preselected depth and/or signal a pull on the fishing line. The fishing float comprises a pair of oppositely disposed buoyant members each having a first end portion. In the preferred embodiment, at least a portion of these buoyant members is fabricated from, or coated with, a luminescent material so as to glow in the dark. The float also comprises a locking stem for releasably joining the first end portions of the buoyant members. The float is secured to the fishing line by winding the line around the locking stem and locking the first end portions of the buoyant members together so as to secure the line therebetween.

BRIEF DESCRIPTION OF THE DRAWINGS

The above-mentioned features of the present invention will become move clearly understood from the following detailed description of the invention read together with the drawings in which.

BEST MODE FOR CARRYING OUT THE INVENTION

Figure 1:
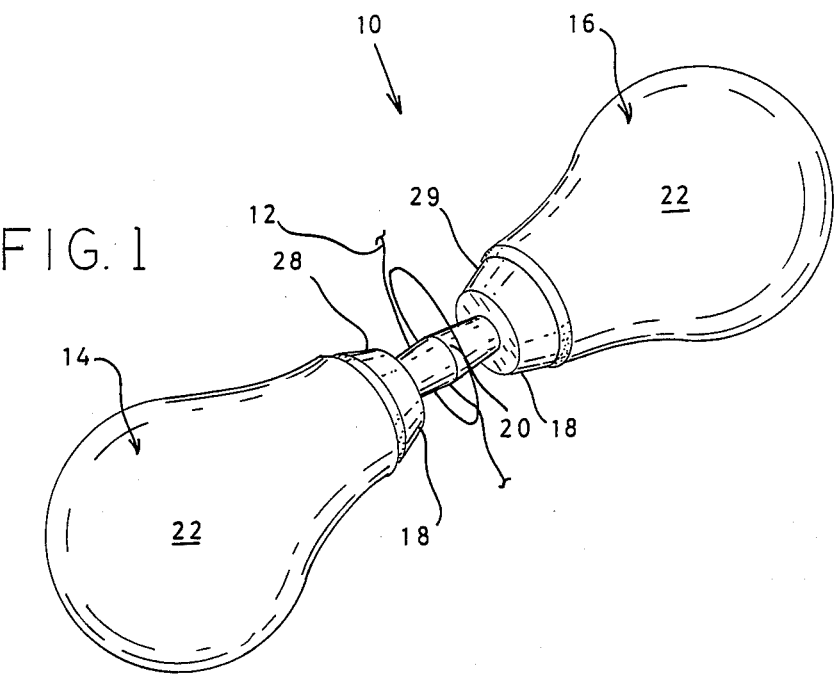
FIG. 1 illustrates a perspective view of a fishing float of the present invention.
Figure 2:
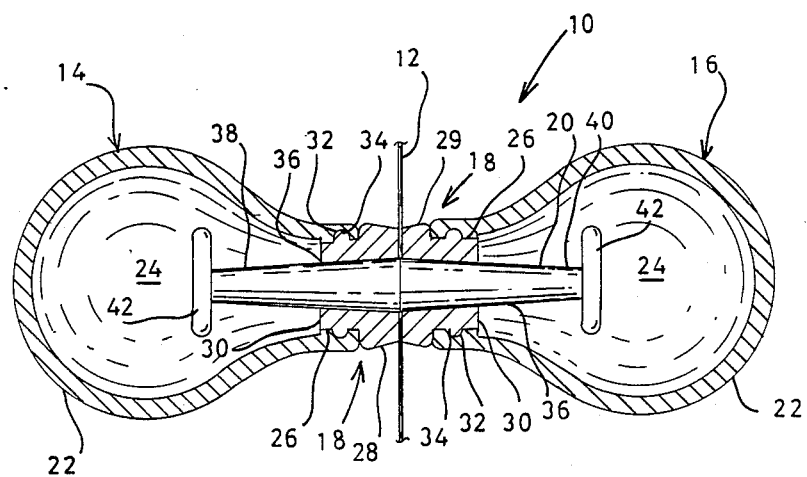
FIG. 2 illustrates a side elevation view, in section, of a fishing float of the present invention.

A fishing float incorporating various features of the present invention is illustrated at 10 in FIGS. 1 and 2. The float 10 is designed for floating on the surface of water and for being releasably secured on a fishing line 12 so as to maintain the line 12 at a desired depth and/or to signal a pull on the line 12. The float 10 generally comprises first and second buoyant members 14 and 16, respectively, releasably joined at their first end portions 18 by a locking stem 20, the buoyant members 14 and 16 being sufficiently buoyant to support the desired bait and tackle secured to the line 12.

More specifically, in the preferred embodiment, each of the buoyant members 14 and 16 includes a bulb 22 defining a cavity 24 therein and an opening 26 accessing the cavity 24. Further, each of the buoyant members 14 and 16 includes a boot member 28, 29 having a rearward end portion 30 for being closely received in the opening 26 of the operatively associated bulb 22. In order to facilitate the releasable securing of each boot member 28, 29 in its associated opening 26, each of the openings 26 defines an interior surface provided with an annular groove 32 for lockably receiving a circumferential ridge 34 provided on the exterior surface of the rearward end portion 30 of each boot member 28, 29. It will, however, be recognized that the boot members 28 and 29 can be fixedly secured in their respective openings 26, if desired, or the boot members 28 and 29 can be integral with the bulbs 22.

In the preferred embodiment of the float 10, the bulbs 22 are fabricated of a luminescent or phosphorescent material such as a strong, durable luminescent plastic. Accordingly, the bulbs 22 glow in the dark such that the float 10 can be used at night and still serve to signal a pull on the fishing line. It will be recognized, however, that this ability to glow in the dark can also be achieved by coating the bulbs 22, or a portion thereof, with a luminescent paint.

As illustrated in FIG. 2, the boot members 28 and 29 are provided with substantially coaxial apertures 36 extending therethrough for receiving the locking stem 20. More specifically, in the preferred embodiment, the boot members 28 and 29 are fabricated of rubber or another flexible rubber-like material and the apertures 36 closely receive the stem 20 such that the stem 20, or a portion thereof, force fits into the apertures 36 to be releasably gripped by the boot members 28 and 29. It will also be noted that fabricating the boot members 28 and 29 out of rubber or a rubber-like material insures a liquid impervious seal between the stem 20 and the boot members 28 and 29, and between the boot members 28 and 29 and their associated bulbs 22 such that the liquid impervious integrity, and, thus, the buoyancy, of the float members 14 and 16 is maintained.

In the preferred embodiment of FIGS. 1 and 2, the stem 20 gradually decreases in cross-sectional diameter, or tapers, outwardly from a point substantially midway its length toward its outboard end portions 38 and 40.

Accordingly, it will be recognized that the force fit engagement of the boot members 28 and 29 with the stem 20 occurs as the boot members 28 and 29 are slidably moved toward such midway point with the grip of the boot members 28 and 29 tightening as the boot members 28 and 29 approach the midway point. Further, the outboard end portions 38 and 40 define cross-sectional diameters which are smaller than the apertures 36. Resultantly, by moving the boot members 28 and 29 to the outboard end portions 38 of the stem 20, any water which may have seeped into the cavity 24 can be allowed to drain out through the space between the walls of the apertures 36 and the stem 20. It will also be noted that stop members 42 can be provided at the outboard end portions 38 and 40 to prohibit the stem 20 from being withdrawn from the apertures 36 thereby insuring that the various components of the float 10 do not become separated.

With respect to the securing of the float 10 on the fishing line 12, as illustrated in FIG. 1, the line 12 is wound around the stem 20, and the boot members 28 and 29 are moved toward the midway point of the stem 20, thereby establishing a force fit engagement between the boot members 28 and 29 and the stem 20 and locking the line 12 between the forward surfaces of the boot members 28 and 29 as illustrated in FIG. 2. It will be appreciated that the combination of the winding of the line 12 around the stem 20 and the grip of the boot members 28 and 29 insures that the float 10 is firmly secured on the line 12, yet results in no damage to the line 12. In order to disengage the float 10 from the line 12 one, or both, of the boot members 28 and 29 is moved toward the outboard end portions 38 and/or 40 such that the members 28 and 29 no longer serve to secure the position of the line 12, and the line 12 is then unwound from the stem.

Figure 3:
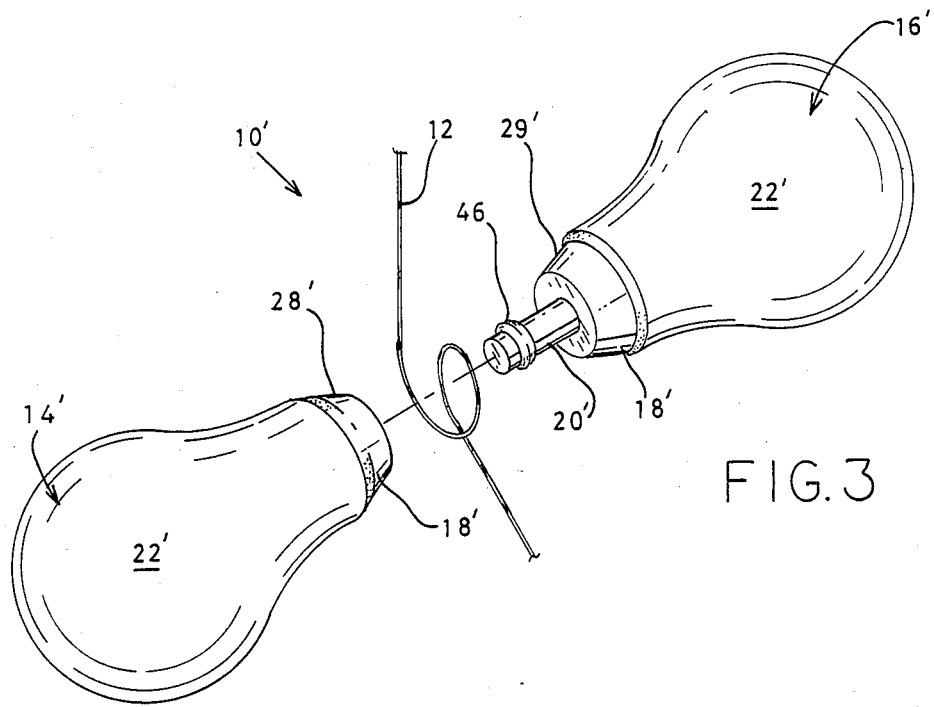
FIG. 3 illustrates a perspective view of an alternate embodiment of a fishing float of the present invention.
Figure 4:
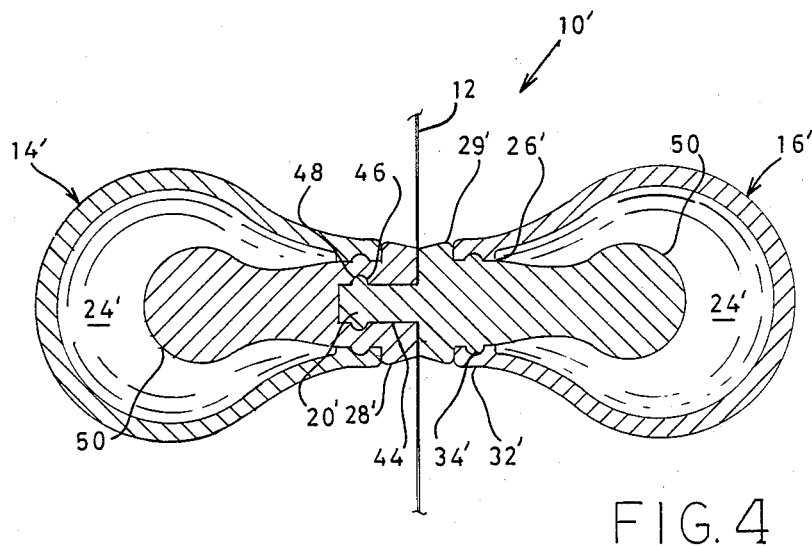
FIG. 4 illustrates a side elevation view, in section, of an alternate embodiment of a fishing float of the present invention.

In FIGS. 3 and 4, an alternate embodiment of the float of the present invention is illustrated at 10'. For convenience, components of the float 10' which are common to the above-described float 10 will be referenced by common prime numerals. In this alternate embodiment, the boot member 28' defines a receptor 44. A locking stem 20' protrudes from the forward surface of the boot member 29' for force fit insertion into the receptor 44, thereby releasably securing the boot members 28' and 29' together. In the preferred illustrated embodiment, the stem 20' is provided with a circumferential ridge 46 for being received in an annular groove 48 provided in the receptor 44 in order to releasably lock the stem 20' in place, but other suitable locking means can be utilized. It will also be noted that in this alternate embodiment, the boot members 28' and 29' have outboard end portions 50 which define cross-sectional diameters greater than the openings 26, thereby insuring that the various components of the float 10' do not become separated.

As illustrated in FIGS. 3 and 4, the float 10' is secured to the line 12 in much the same manner as described with respect to the float 10. The line 12 is wound around the stem 20' and the stem 20' is inserted into the receptor 44, thereby securing the boot members 28' and 29' together with the line 12 locking between their forward surfaces. Releasing the float 10' is simply a matter of disengaging the stem 20° from the receptor 44 and unwinding the line 12 from the stem 20'.

In light of the above, it will be recognized that the present invention provides a fishing float with great advantages over the prior art. The float can be quickly and easily secured on, or removed from, fishing line, and is secured without causing damage to the fishing line. The dual buoyant members 14 and 16 insure that the float 10, 10' is clearly visible as it floats on the surface of the water, and the luminescence of the buoyant members allows the float to be used at night.

While a preferred embodiment has been shown and described, it will be understood that there is no intent to limit the invention to such disclosure, but, rather, it is intended to cover all modifications and alternate constructions falling within the spirit and scope of the invention as defined in the appended claims.

We claim:

1. A fishing float for releasably engaging a fishing line and for floating on the surface of water so as to maintain said line at a preselected depth and/or signal a pull on said fishing line, said fishing float comprising:
   a first buoyant member for floating on said surface of said water, said first buoyant member having a first end portion;
   a second buoyant member for floating on said surface of said water, said second buoyant member having a first end portion; and
   a locking stem for releasably joining said first end portions of said first and second buoyant members, whereby said line is received about said locking stem, and releasably secured between said first end portion of said first buoyant member and said first end portion of said second buoyant member wherein each said buoyant member included a bulb defining a cavity therein and an opening accessing said cavity, and also includes a boot member having a rearward end portion for being releasably received in said opening in said bulb, said boot member defining an aperture for force fit reception of said locking stem.

2. The fishing float of claim 1 wherein at least a portion of one said buoyant member is fabricated of a luminescent material so as to glow in the dark.

3. The fishing float of claim 1 wherein at least a portion of one said buoyant member is coated with a luminescent material so as to glow in the dark.

4. The fishing float of claim 1 wherein said locking stem has first and second ends and said stem is outwardly tapered from a point substantially midway between said first and second ends and points proximate said first and second end of said stem, and wherein each said first and second end of said stem carries a stop member for prohibiting removal of said stem from said aperture of said boot member.

5. The fishing float of claim 4 wherein each said boot member is fabricated of rubber.

6. The fishing float of claim 1 wherein each said bulb is fabricated of a luminescent plastic.

7. The fishing float of claim 1 wherein said first end portion of said first buoyant member defines an aperture for force fit reception of said locking stem, and wherein said locking stem is mounted on, and protrudes from, said first end portion of said second buoyant member.

8. The fishing float of claim 1 wherein said first buoyant member includes a first bulb defining a cavity therein and an opening accessing said cavity, and also includes a first boot member having a rearward end portion for being releasably received in said opening in said first bulb, said first boot member defining an aperture for force fit reception of said locking stem, and wherein said second buoyant member includes a second bulb defining a cavity therein and an opening accessing said cavity, and also includes a second boot member carrying said locking stem, said second boot member having rearward end portion for being releasably receive in said opening in said second bulb.

9. The fishing float of claim 8 wherein at least a portion of one said buoyant member is fabricated of a luminescent material so as to glow in the dark.

10. The fishing float of claim 8 wherein at least a portion of one said buoyant member is coated with a luminescent material so as to glow in the dark.

11. A fishing float for releasably engaging a fishing line and for floating on the surface of water so as to maintain said line at a preselected depth and/or signal a pull on said fishing line, said fishing float comprising:

first and second buoyant members, each said buoyant member including a bulb fabricated of a luminescent material, said bulb defining a cavity therein and an opening accessing said cavity, and each said buoyant member also including a boot member having a rearward end portion for being releasably received in said opening in said bulb, said boot member defining an aperture therethrough communicating with said cavity; and a locking stem for releasably joining said first and second buoyant members, said stem having first and second end portions for force fit reception in said apertures of said boot members, said stem being outwardly tapered from a point substantially midway between said first and second end portions and points proximate said first and second end portions of said stem, each said first and second end portion of said stem carrying a stop member for prohibiting removal of said stem from said aperture of said boot members, whereby said line is received about said locking stem, and releasably secured between said boot member of said first buoyant member and said boot member of said second buoyant member.

* * * * *